(12) United States Patent
Ellis et al.

(10) Patent No.: US 8,104,290 B2
(45) Date of Patent: Jan. 31, 2012

(54) COMBUSTION LINER DAMPER

(75) Inventors: Charlie Ellis, Stuart, FL (US); Carlos Calderon, Loxahatchee, FL (US)

(73) Assignee: Alstom Technology Ltd. (CH)

( * ) Notice: Subject to any disclaimer, the term of this patent is extended or adjusted under 35 U.S.C. 154(b) by 660 days.

(21) Appl. No.: 12/251,973

(22) Filed: Oct. 15, 2008

(65) Prior Publication Data

US 2010/0089068 A1    Apr. 15, 2010

(51) Int. Cl.
*F02C 7/20*    (2006.01)
(52) U.S. Cl. ............. 60/796; 60/799; 267/158; 267/160
(58) Field of Classification Search ............... 60/752, 60/754–760, 796, 799, 800, 804; 267/136, 267/158, 160
See application file for complete search history.

(56) References Cited

U.S. PATENT DOCUMENTS

| | | | | |
|---|---|---|---|---|
| 1,217,724 | A * | 2/1917 | Dwork | 152/254 |
| 3,417,984 | A * | 12/1968 | Sindlinger | 267/160 |
| 4,413,477 | A * | 11/1983 | Dean et al. | 60/757 |
| 5,337,583 | A | 8/1994 | Giles | |
| 5,356,264 | A * | 10/1994 | Watson et al. | 415/119 |
| 6,073,896 | A * | 6/2000 | McFadden | 248/231.81 |
| 6,216,442 | B1 | 4/2001 | Belsom | |
| D449,776 | S * | 10/2001 | Barnett et al. | D8/382 |
| 7,464,940 | B2 * | 12/2008 | Datta | 277/555 |
| 2003/0106863 | A1 * | 6/2003 | Lauchner et al. | 211/26 |

* cited by examiner

*Primary Examiner* — Ted Kim
*Assistant Examiner* — Michael B Mantyla
(74) *Attorney, Agent, or Firm* — Shook, Hardy & Bacon, L.L.P.

(57) ABSTRACT

The present invention are directed towards a system and method for providing a way of reducing the vibrations and wear between mating components of a gas turbine combustor. The gas turbine combustor includes a flow sleeve having a plurality of liner stops and a combustion liner located radially within the flow sleeve. Spring dampers are positioned between the combustion liner and the flow sleeve to restrict the relative movement between the flow sleeve and the combustion liner and dampen vibrations at their assembly location. The spring dampers are capable of compressing to permit thermal growth between the combustion liner and flow sleeve.

5 Claims, 8 Drawing Sheets

COMBUSTION LINER DAMPER

CROSS-REFERENCE TO RELATED APPLICATIONS

Not applicable.

TECHNICAL FIELD

The present invention relates to gas turbine engines. More particularly, embodiments of the present invention relate to an apparatus and method for damping vibrations that occur in a gas turbine combustor.

BACKGROUND OF THE INVENTION

Gas turbine engines operate to produce mechanical work or thrust. One type of gas turbine engine is a land-based engine that has a generator coupled thereto which harnesses the mechanical work for the purposes of generating electricity. A gas turbine engine typically comprises at least a compressor section having a series of rotating compressor blades, one or more combustors, and a turbine section. Air enters the engine through an inlet and then passes through the compressor, where the rotating blades compress the air and raise its pressure.

The compressed air flows from the compressor and towards the combustion section. For an individual combustor, a flow sleeve envelops a combustion liner, as shown in FIG. 1, directs the air along the combustion liner until the air is injected into the liner. The flow sleeve also serves to help position the liner within the combustor. However, the interface between these two components of the combustion system can give rise to excessive vibrations and wear due to gaps that exist in the assembly between the combustion liner to the flow sleeve. The gaps are necessary to provide for ease of assembly of the combustion parts.

The compressed air, which is directed into one or more combustors is mixed with fuel and the mixture is ignited. The hot combustion gases are then directed from the combustion section to a turbine section by a transition duct.

SUMMARY

Embodiments of the present invention are directed towards a system and method for, among other things, providing a way of reducing the vibrations and relative motion between mating components of a gas turbine combustor. The present invention provides an embodiment directed towards a gas turbine combustor comprising a flow sleeve having a plurality of liner stops and a combustion liner located radially within the flow sleeve. One or more spring dampers are positioned between the combustion liner and the flow sleeve. The spring dampers are configured so as to permit compression. This compression occurs primarily as the combustion liner moves radially outward towards the flow sleeve during operation at elevated temperatures. The spring damper maintains contact with both the flow sleeve and the combustion liner so as to dampen the vibrations between the mating components.

The present invention also provides a spring damper for use in a gas turbine combustor. The spring damper has a generally corrugated body with an inner radial wall portion connected to an outer radial wall portion by a pair of radially extending sidewalls. Located in the inner and outer radial wall portions is a plurality of generally U-shaped portions. The spring damper also includes a retention mechanism that extends generally parallel in an axial direction to the inner radial wall portion. The spring damper includes a retention mechanism for attaching to the combustion liner or the flow sleeve to restrict movement in at least the axial direction.

The present invention also comprises a method of reducing vibrations between a combustion liner and a flow sleeve in a gas turbine combustor. A combustion liner is inserted radially within a flow sleeve and once located in the desired axial position, one or more spring dampers are compressed, so as to reduce their radial height. The one or more spring dampers are compressed by pressing portions of the inner radial wall and the outer radial wall towards each other. The compressed spring dampers are placed radially between the combustion liner and the flow sleeve and then released from the compressed state. As a result, the spring damper applies a pressure load to the combustion liner and the flow sleeve which serves to dampen vibrations that occur between the combustion liner and flow sleeve.

Additional advantages and features of the present invention will be set forth in part in a description which follows, and in part will become apparent to those skilled in the art upon examination of the following, or may be learned from practice of the invention.

BRIEF DESCRIPTION OF THE SEVERAL VIEWS OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different components, combinations of components, steps, or combinations of steps similar to the ones described in this document, in conjunction with other present or future technologies.

Figure 1:
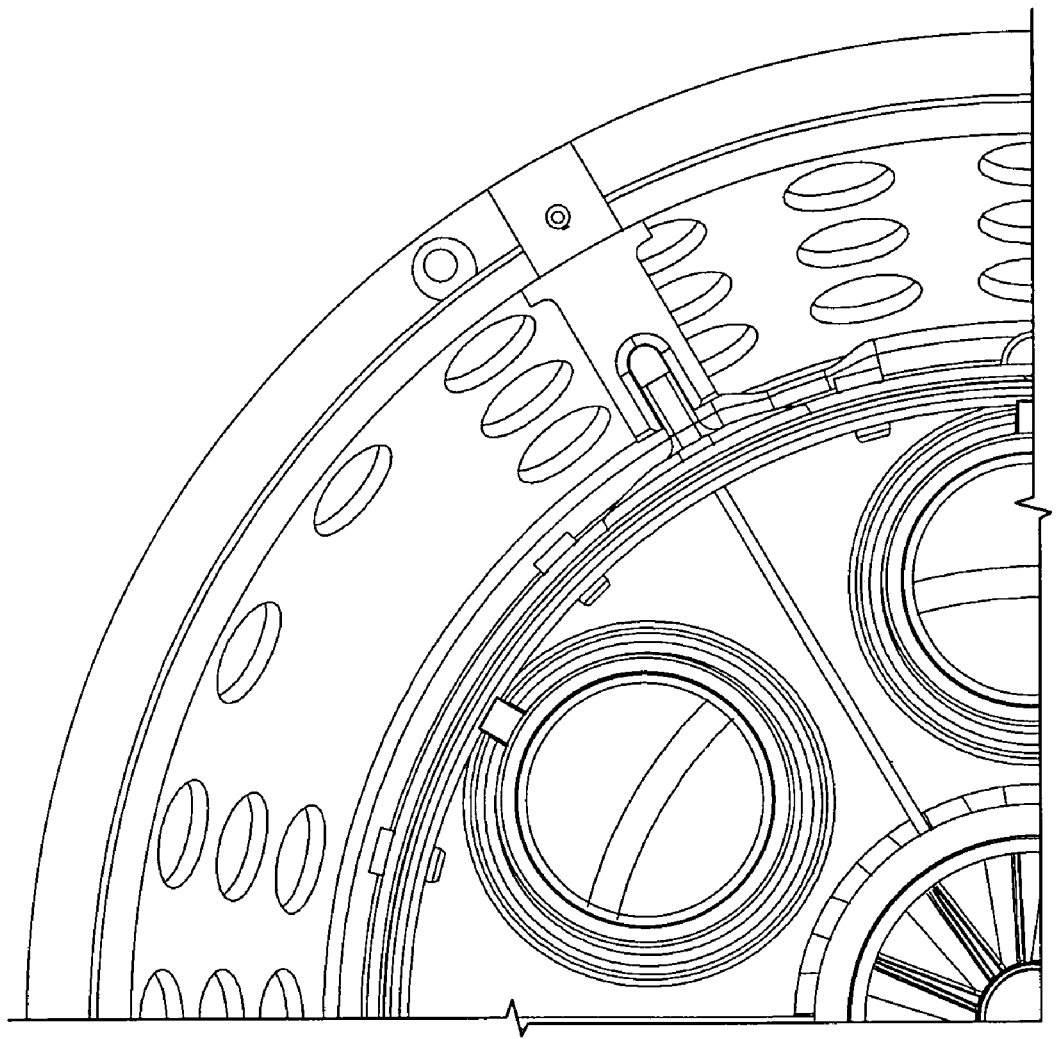
FIG. 1 depicts a partial end view of a portion of a combustion liner installed in a flow sleeve in accordance with a prior art configuration.
Figure 2:
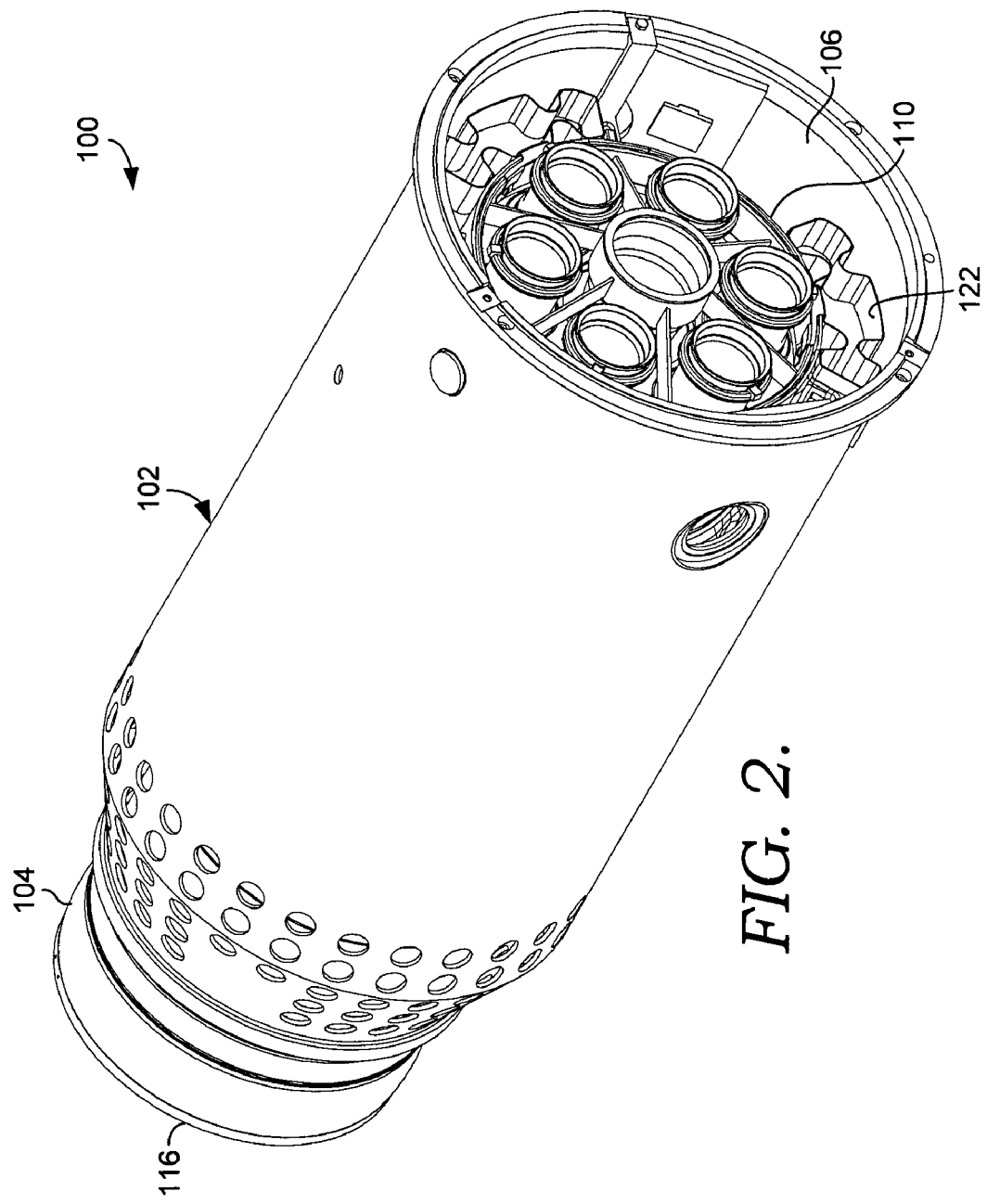
FIG. 2 depicts a perspective view in accordance with an embodiment of the present invention.
Figure 3:
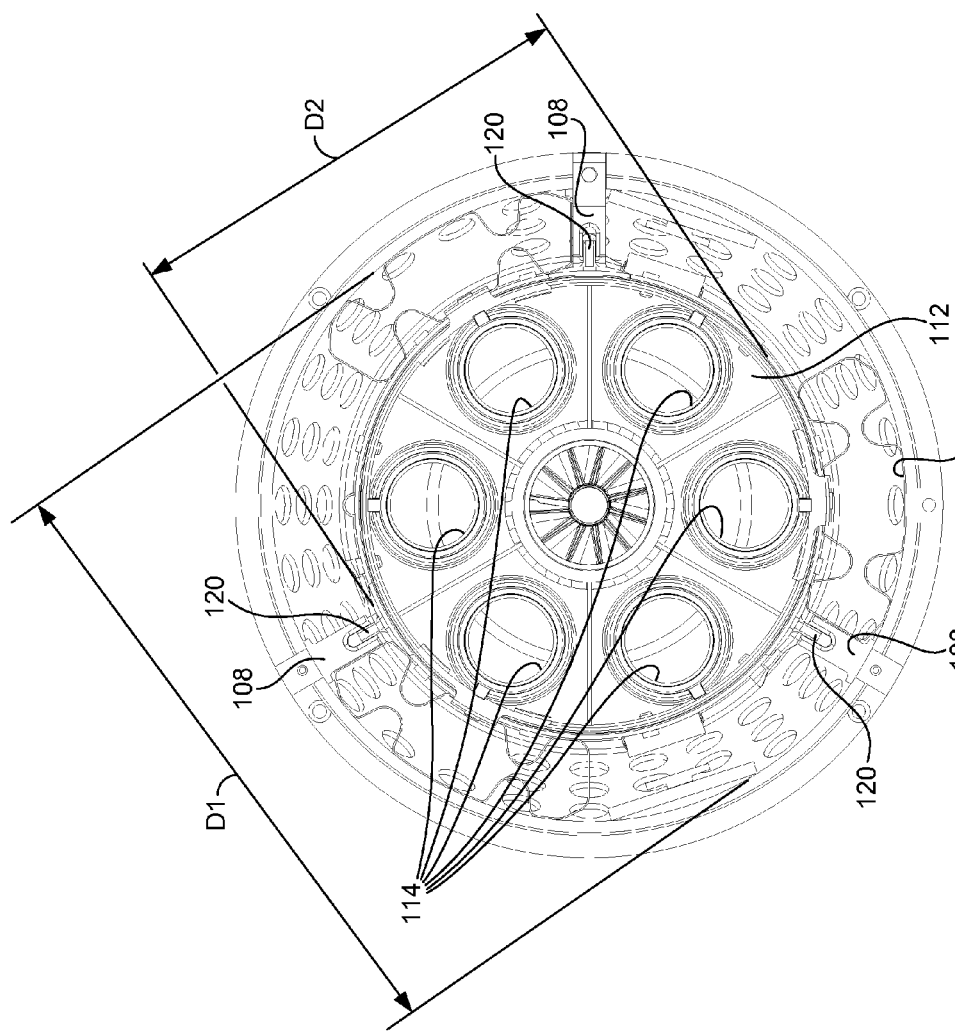
FIG. 3 depicts an end view in accordance with an embodiment of the present invention.

The present invention will now be described with reference to the accompanying FIGS. 2-8. Referring initially to FIGS. 2 and 3, a gas turbine combustor 100 is shown having a flow sleeve 102 and a combustion liner 104. The flow sleeve 102 has a sleeve wall 106 with a first diameter D1, and a plurality of liner stops 108 that extend radially inward from the sleeve wall 106.

The combustion liner 104 comprises a generally annular liner wall 110 having a second diameter D2 that is smaller than first diameter D1 such that the combustion liner 104 is located radially within the flow sleeve 102. However, the combustion liner 104 also has an inlet end 112 with one or more openings 114 and an outlet end 116 located generally opposite of the inlet end 112. The one or more openings 114 are sized to receive one or more fuel injectors.

Figure 4:
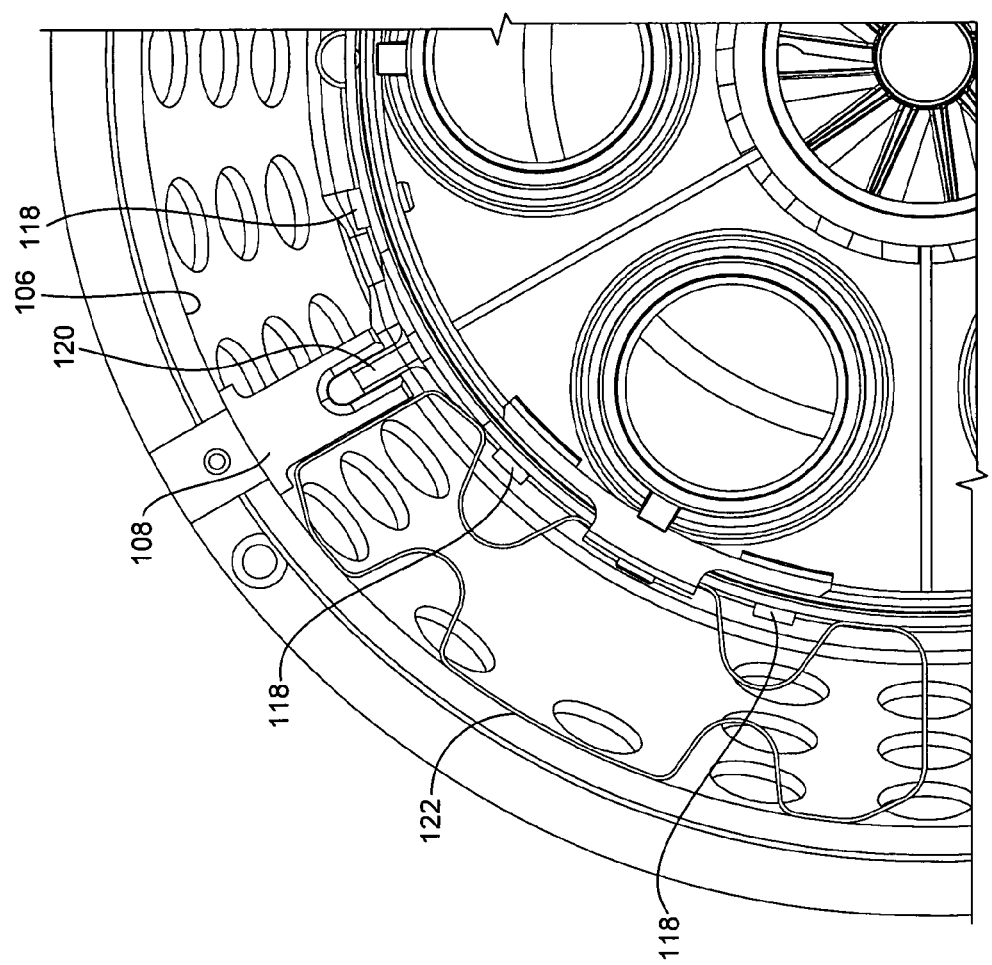
FIG. 4 depicts a partial end view of a combustion liner installed in a flow sleeve in accordance with an embodiment of the present invention.
Figure 5:
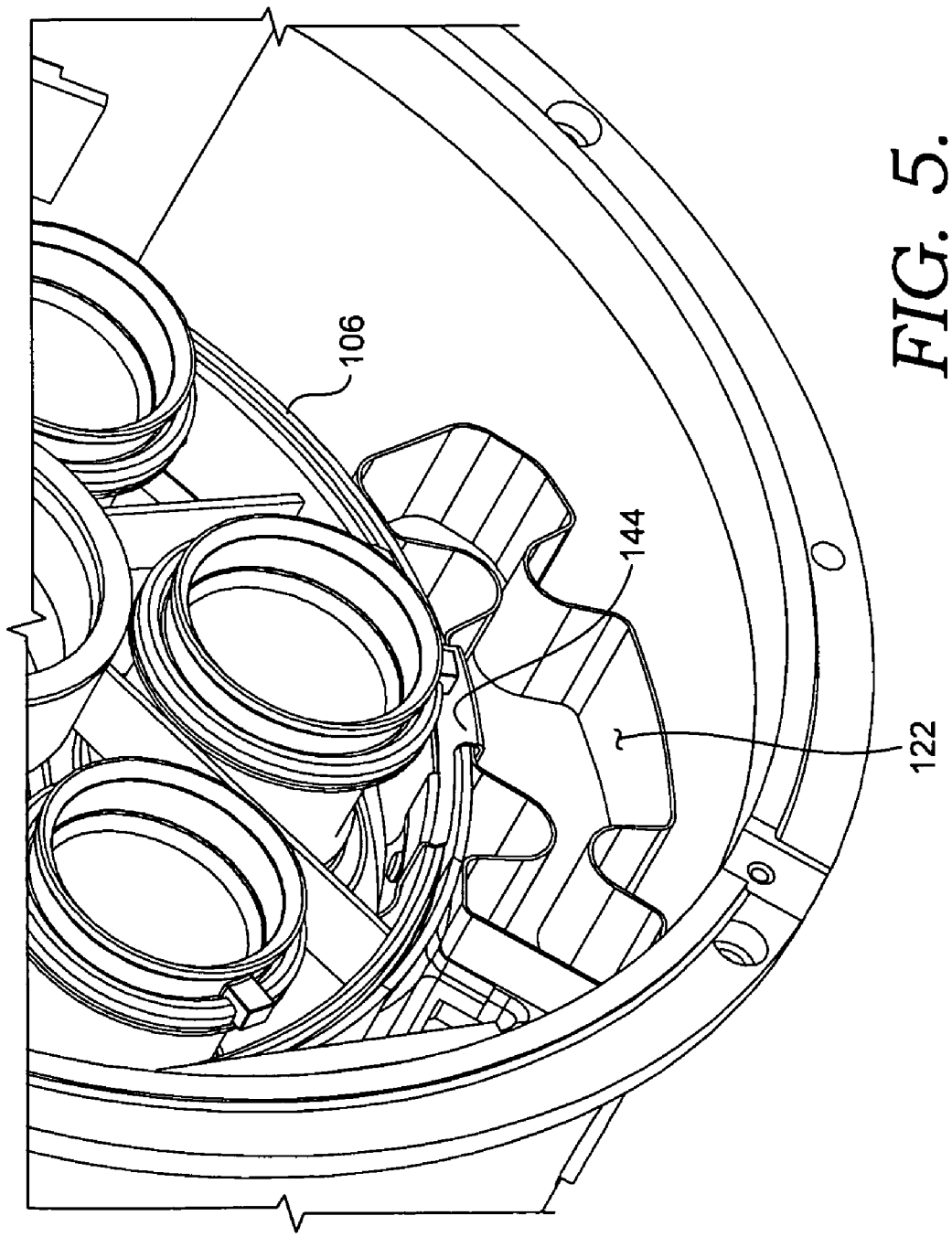
FIG. 5 depicts a partial perspective view of a combustion liner installed in a flow sleeve with a spring damper in accordance with an embodiment of the present invention.

Referring to FIG. 4, the combustion liner 104 also comprises a retention device 118 located adjacent to an inlet end 112. The retention device 118 can take on a number of forms, but is intended to at least secure one or more spring dampers 122 in place, as will be discussed in more detail below. For an embodiment of the present invention, the retention device 118 can be a series of pins located about the perimeter of the generally annular wall 110 adjacent to the inlet end 106.

Extending radially outward from the generally annular liner wall 110 is a plurality of locating tabs 120. These locating tabs are used to secure the combustion liner 104 in at least an axial and circumferential location in the flow sleeve 102. More specifically, the locating tabs 120 slide into slots in the liner stops 108 that correspond generally to the shape of the locating tabs 120, but have dimensions slightly larger than the locating tabs 120. It should be understood that the terms "axial", "radial", and "circumferential", as used herein, generally are provided with reference to a theoretical turbine in which the combustor 100 is installed. Accordingly, "axial" generally means with reference to an axis identical to (or parallel with) an axis of the turbine, "radial" generally means along a radius extending from a center rotational axis of the turbine, and "circumferential" generally means along a circumference of a circular frame of the turbine. Further, the terms "fastener", "bolt", and "pin" are used interchangeably herein to denote a component for mechanically coupling adjacent structures together (e.g., through a threaded interconnection, an interference fit, etc).

The combustor 100 also includes one or more spring dampers 122. An embodiment of the spring damper for the present invention is shown in detail in FIGS. 6-8 and can be installed in the gas turbine combustor 100 as shown in FIGS. 2-5. The spring damper 122 is positioned radially between the flow sleeve 102 and the combustion liner 104 such that a portion of the spring damper maintains contact with the flow sleeve 102 and another portion of the spring damper maintains contact with the combustion liner 104. The spring damper 122 also includes a means for engaging the retention device 118. A variety of means can be used for engaging the retention device 118 and will depend on the type of retention device 118 used. For an embodiment of the present invention depicted in the FIGS., a representative means includes a retention plate 138 having openings 126 sized slightly larger than the pins of the retention device 118. This allows the spring damper 122 to be secured in place.

Figure 6:
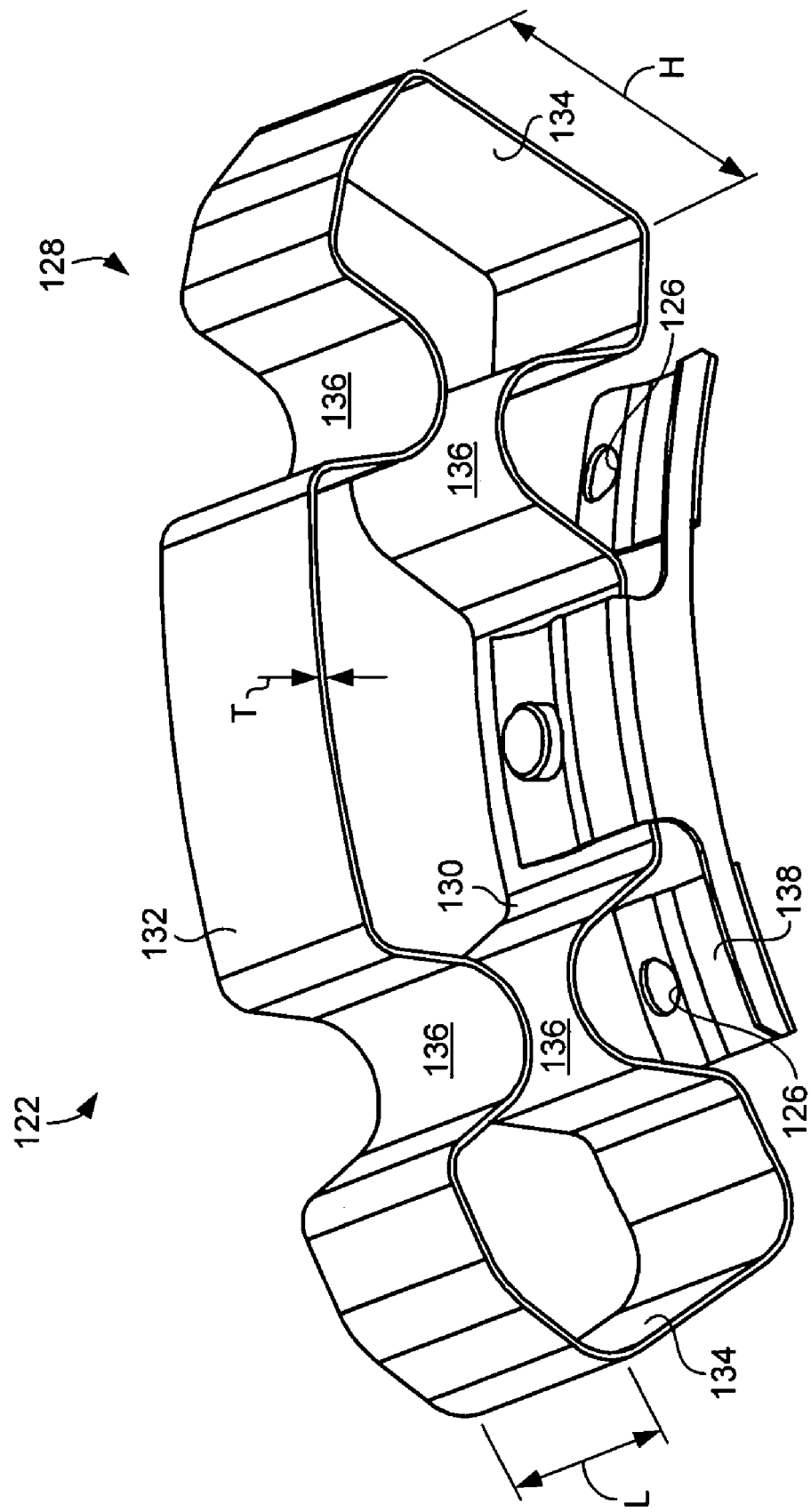
FIG. 6 depicts a perspective view of a spring damper in accordance with an embodiment of the present invention.
Figure 7:
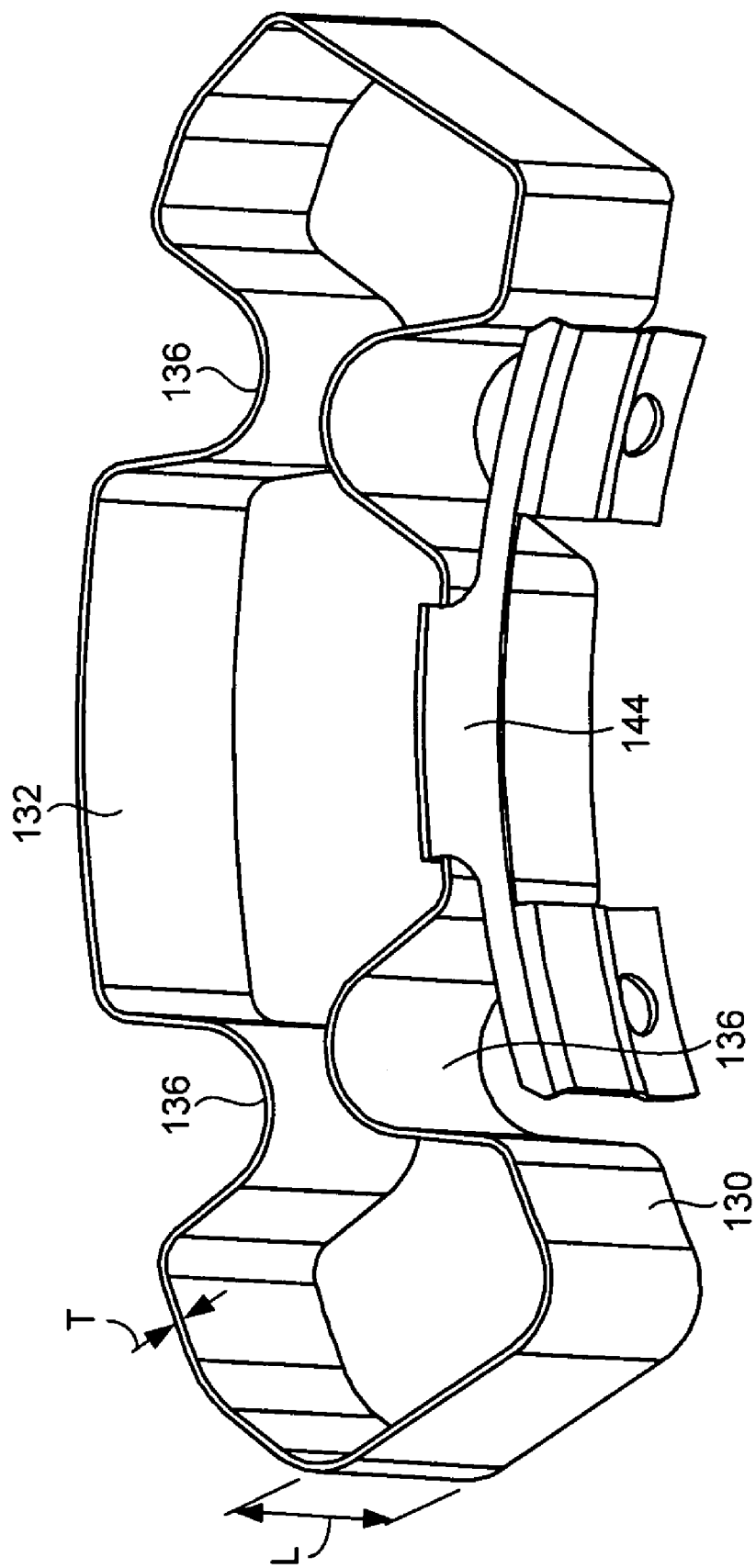
FIG. 7 depicts an alternate perspective view of a spring damper in accordance with an embodiment of the present invention; and, FIG. 8 depicts yet another alternate perspective view of a spring damper in accordance with an embodiment of the present invention.
Figure 8:
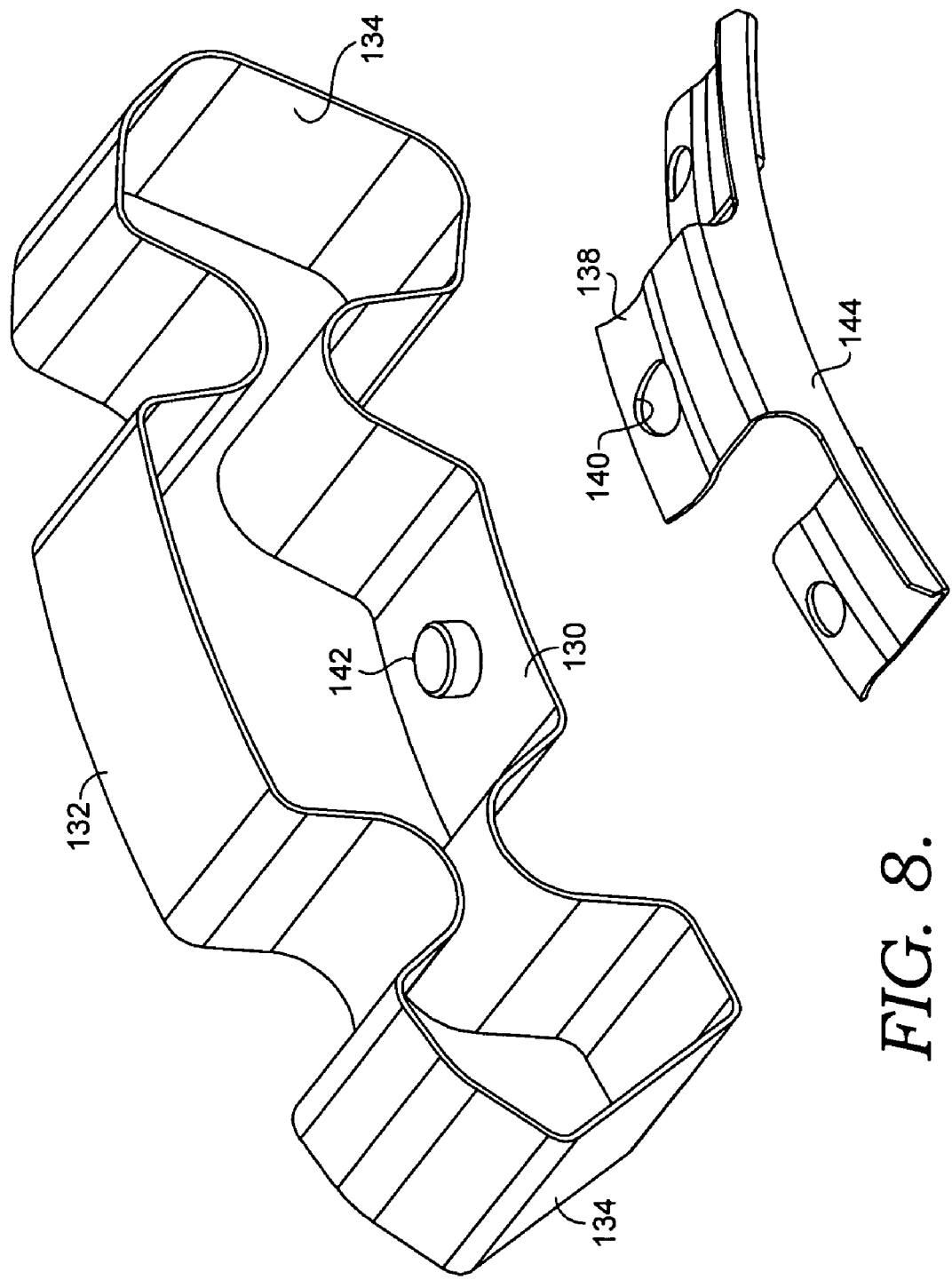

The spring damper 122, which is shown in more detail in FIGS. 6-8, comprises a generally corrugated body 128 having a thickness T and an axial length L. The spring damper 122 has an inner radial wall portion 130 connected to an outer radial wall portion 132 by a pair of radially extending sidewalls 134. The inner and outer radial wall portions, 130 and 132, provide increased surface contact area of the spring damper 122 to the combustion liner 104 and flow sleeve 102 and contains a plurality of generally U-shaped portions 136, whereas the radially extending sidewalls 134 do not have any generally U-shaped portions. The generally U-shaped portions 136 in the inner radial wall portion 130 oppose and are spaced a distance apart from the generally U-shaped portions 136 in the outer radial wall portion 132. This is but one general form of a spring damper and the size of the damper and overall shape of the corrugated body can vary depending on the application.

Extending generally parallel to the inner radial wall portion 130 is a clip portion, or retention plate 138. The retention plate 138 can be integral with the spring damper 122 or a separate component as shown in FIGS. 6-8. As shown in FIG. 8, the retention plate 138 has an opening 140 that engages a pin 142 of the corrugated body 128. The retention plate 138 is also formed in a way so as to apply a pre-load of the retention plate 138 and the inner radial wall portion 130 against the combustion liner 104.

The retention plate 138 is configured so as to aid in locating and securing the spring damper within the gas turbine combustor. In addition to the openings 126, the retention plate 138 also has an edge 144 used for securing the spring damper 122 in an axial direction. This locating means will be discussed in more detail below.

In operation, a cooling fluid such as compressed air flows between the combustion liner 104 and the flow sleeve 102 and towards the inlet end 106. The cooling fluid cools the generally annular liner wall 110 of the combustion liner 104 before entering the combustion liner 104, where it mixes with fuel and ignites to form hot combustion gases used to drive the turbine section of an engine. Since the combustion liner is operating at extremely high temperatures the material of the liner will tend to grow radially outward due to thermal expansion. While the spring dampers are designed to reduce vibrations in and around the liner stops of the flow sleeve 102, the dampers do not inhibit the thermal growth of the combustion liner 104 relative to the flow sleeve 102.

Through the use of one or more spring dampers 122, vibrations between a combustion liner 104 and a flow sleeve 102 are reduced. As previously discussed, the combustion liner 104 is inserted radially within the flow sleeve 102 and positioned such that the plurality of locating tabs 120 are positioned within the plurality of liner stops 108 of the flow sleeve 102. Due to manufacturing and assembly tolerances, there are gaps between the locating tabs 120 and the liner stops 108. During operation, the gaps permit the combustion liner and flow sleeve to move relative to each other at this interface as well as to move relative to other associated combustion components such as cross fire tubes.

The one or more spring dampers 122, in the compressed state, is then placed radially between the combustion liner 104 and the flow sleeve 102. The compressed damper is placed at an axial location where the openings 126 in the retention plate 138 are secured to the retention device 118. This interface coincides with where the edge 144 is located adjacent to the inlet 106 of the combustion liner 104 (see FIG. 5). The location of the edge 144 and openings 126 of the retention plate 138 provide for axial and circumferential restraint of the spring damper 122. The compressed spring damper is then released, allowing the inner radial wall portion 130 to contact and apply a pressure load to the combustion liner 104 and outer radial wall portion 132 to contact an apply a pressure load to the flow sleeve 102. During operation, the combustion liner expands radially and portions of the inner radial wall 130 and outer radial wall 132 are compressed, which reduces the radial height H of the spring damper 122. The spring damper 122 is configured through its corrugated shape and generally U-shaped portions 136 to impart a pre-load in the radial direction.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

What is claimed is:

1. A spring damper for use in a gas turbine combustor comprising:

a generally corrugated body having a thickness and an axial length, an inner radial wall portion connected to an outer radial wall portion by a pair of radially extending sidewalls;

a plurality of generally U-shaped portions located in each of the inner and outer wall portions; a generally straight portion connecting said plurality of generally U-shaped portions located in the inner wall and a generally straight portion connecting said plurality of generally U-shaped portions located in the outer wall; wherein said straight portion in the outer wall is generally parallel to said straight portion in the inner wall;

a retention mechanism extending generally parallel to the axial length of the inner radial wall portion being attached to it and applying a pre-load force against a combustion liner, and the outer wall portion applying a pressure to a flow sleeve; the said plurality of U-shaped portions in the outer wall being generally symmetric to said plurality of generally U-shaped portions in the inner wall;

wherein the generally U-shaped portions in the inner radial wall portion opposes the generally U-shaped portions in the outer radial wall portion.

2. The spring damper of claim 1 fabricated from a material having a spring constant and having a material thickness up to 0.090 inches.

3. The spring damper of claim 2, wherein the pair of radially extending sidewalls do not have generally U-shaped portions.

4. The spring damper of claim 1, wherein the generally U-shaped portions of the inner radial wall portion are spaced a distance apart from the generally U-shaped portions of the outer radial wall portion.

5. The spring damper of claim 1, wherein the damper compresses in a radial direction upon thermal growth of the combustion liner.

* * * * *